(12) United States Patent
Kelly

(10) Patent No.: US 6,248,278 B1
(45) Date of Patent: Jun. 19, 2001

(54) COMPRESSION MOULDING METHOD

(75) Inventor: Paul Andrew Kelly, Atherston (GB)

(73) Assignee: Trisport Limited

( * ) Notice: Subject to any disclaimer, the term of this patent is extended or adjusted under 35 U.S.C. 154(b) by 0 days.

(21) Appl. No.: 09/191,225

(22) Filed: Nov. 13, 1998

(30) Foreign Application Priority Data

| Nov. 15, 1997 | (GB) | ................................................ 9724113 |
| Jul. 7, 1998 | (GB) | ................................................ 9814584 |

(51) Int. Cl.[7] ............................ B29C 33/12; B29C 43/18
(52) U.S. Cl. ......................... 264/244; 264/267; 264/275; 36/32 R
(58) Field of Search .................................... 264/250, 259, 264/267, 268, 271.1, 275, 273, 244, 276, 319; 36/115, 127, 128, 132, 32 R

(56) References Cited

U.S. PATENT DOCUMENTS

| 3,327,412 | * | 6/1967 | Wilmanns et al. ....................... 36/59 |
| 3,739,499 | | 6/1973 | Morin ................................ 36/2.5 AH |
| 3,875,654 | * | 4/1975 | Ushijima ............................... 264/268 |
| 4,141,950 | * | 2/1979 | Thompson ............................ 264/267 |
| 4,189,459 | * | 2/1980 | Jones ..................................... 264/267 |
| 4,379,112 | * | 4/1983 | Heikes, Jr. et al. ................. 264/259 |
| 4,447,373 | * | 5/1984 | Chappell et al. ..................... 264/248 |
| 4,464,322 | * | 8/1984 | Butler ................................... 264/267 |
| 4,464,326 | * | 8/1984 | Nishihara ............................. 264/250 |
| 5,478,519 | * | 12/1995 | Carrara et al. ....................... 264/267 |
| 5,514,319 | * | 5/1996 | Young .................................. 264/163 |
| 5,673,472 | * | 10/1997 | Muller ................................ 29/432.1 |

FOREIGN PATENT DOCUMENTS

| 4 339 277 | 5/1995 | (DE) . |
| 708 818 | 7/1931 | (FR) . |
| 1 360 111 | 8/1964 | (FR) . |
| 651 253 | 3/1951 | (GB) . |
| 59-202833 | 11/1984 | (JP) . |
| 5-069444 | 3/1993 | (JP) . |
| 6-015674 | 1/1994 | (JP) . |
| 90 12517 | 11/1990 | (WO) . |

* cited by examiner

*Primary Examiner*—Angela Ortiz

(57) ABSTRACT

A method of compression moulding an article from rubber moulding material incorporating hollow inserts avoids damage to the inserts. Where compression moulding takes place in an enclosed mould at an elevated pressure, the pressure can distort and damage the hollow inserts especially if they are of plastics. In order to avoid such distortion and damage, the method compresses during moulding creating a pressure in a cavity of the insert which substantially balances the pressure exerted on the exterior of the insert by the rubber moulding material in the mould. The pressure in the cavity is preferably produced by introducing some rubber moulding material into the cavity of the insert. This material becomes pressurised during moulding and supports the interior of the insert.

12 Claims, 2 Drawing Sheets

COMPRESSION MOULDING METHOD

This invention relates to a method of compression moulding articles incorporating hollow inserts.

In compression moulding, a mass of uncured rubber (which term is used herein to include both natural and synthetic rubber materials) is enclosed within a mould under high pressure (e.g. around 7½ tons per square inch) and at an elevated temperature (e.g. around 140° C.) sufficient to cause curing of the rubber. As the pressure and temperature of the moulding material rises, the material becomes more fluid and flows to fill the mould cavity. Over a period of typically around ten minutes, the material becomes cured and re-solidifies, after which the mould can be opened and the moulded product removed.

It is common to want to mould hollow inserts into compression moulded articles. For example, sports shoes such as golf shoes or football boots may require receptacles in the shoe sole to secure replaceable ground-gripping elements such as cleats or studs. The cleat is usually secured in the hollow receptacle by a screw-threaded engagement or a bayonet-type connection. There are also many engineering components of moulded material having hollow inserts. Thus, a vehicle door seal may require nuts to be moulded in, or an engine mounting block may have a female-threaded component moulded in. Similar components are used extensively in the aircraft industry.

Compression moulding can be effected with steel or other metal inserts without difficulty. However, it is found that hollow plastics inserts suffer deleteriously during compression moulding from the combination of heat and pressure applied to them. The inserts become distorted and any screw thread or similar formations within the cavity of the insert are seriously damaged or even wholly destroyed. As a consequence, it has so far not been possible to incorporate hollow plastics inserts into compression moulded articles on a production basis.

According to the present invention, in a method of compression moulding an article from rubber moulding material incorporating at least one insert having a cavity, the moulding taking place in an enclosed mould, at an elevated pressure, the method comprises during moulding creating a pressure within the cavity of the insert which substantially balances the pressure exerted on the exterior of the insert by the rubber moulding material in the mould.

It has been found that pressurising the interior of the insert counteracts the crushing effects of the mould pressure applied to the exterior of the insert, so that damage to the insert is avoided.

Various techniques for pressurising the cavity of the insert could be employed. For example, pressure could be applied hydraulically by introducing oil. Alternatively, an inflatable insert-locating pin could be used within the cavity, the pin being expanded to fill the cavity and exert pressure.

However, a preferred technique is to introduce some of the rubber moulding material (or a material with suitably similar performance) into the cavity of the insert. This material itself becomes pressurised during the moulding process and so supports the insert internally to prevent damage from the external pressures.

Moulding material may be allowed, by provision of a suitable channel in the mould tooling, to feed into the cavity of the insert during moulding. However, this leaves a plug of material formed within the cavity, and secured by a linking piece to the rest of the moulded article. The linking piece then has to be separated from the article when the article is removed from the mould. It is, therefore, preferred that a suitable quantity of moulding material is introduced into the cavity of the insert separately, being introduced prior to the mould being closed and moulding commencing. As moulding proceeds, heat and pressure are transmitted to the material within the cavity of the insert, the material flowing to fill the cavity and protect the thread and/or other formations within the cavity. Preferably sufficient material is provided in the cavity of the insert to ensure that all parts of the cavity are protected by the material. It may also be sufficient to provide an excess which overflows into an overflow chamber provided in the tooling. The material in the cavity forms a plug, while that in the overflow chamber forms a handle which eases grasping of the plug for removal from the cavity after moulding.

Preferably each insert is supported during moulding on a locating means, including a pin for insertion into the cavity and a tube for location of the exterior of the insert. The pin may be part of the mould tooling. The moulding material introduced into the cavity may then be provided by a sheet of moulding material which is cut by the locating means as the insert is placed on the locating means. Alternatively, the pin may itself be formed from moulding material, to provide the necessary material in the cavity of the insert.

The invention is particularly useful for moulding shoe soles with inserts comprising socket-forming receptacles adapted to secure a ground-gripping element to the underside of the sole. Using the method of the invention, the receptacles may be pre-formed from plastics, and moulded into the shoe sole without being damaged.

There now follows a description, to be read with reference to the accompanying drawings, of a compression moulding process which illustrates the invention by way of example.

Figure 1:
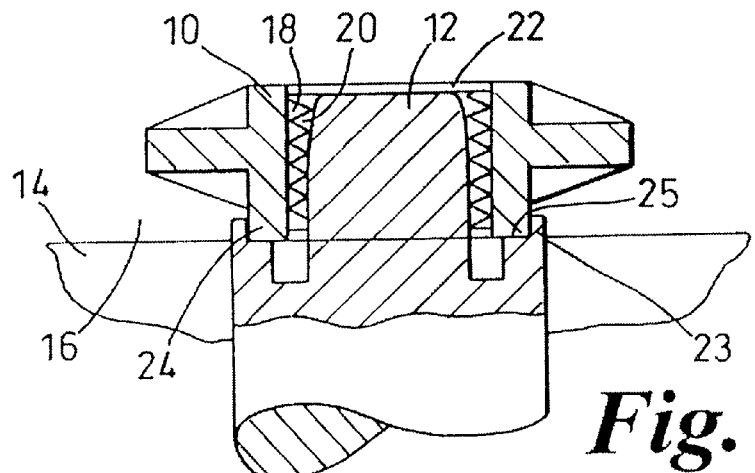
FIG. 1 shows an insert mounted on a locating pin of a moulding tool in a conventional manner (prior art)

FIG. 1 shows a conventional mould tool for the moulding of a shoe sole with an insert 10 comprising a cleat-securing receptacle. In the conventional sole-moulding process the cleat-securing receptacle 10 (being one of a plurality of receptacles to be incorporated simultaneously into a sole being moulded) is located on a locating pin 12 of mould tooling 14 defining a mould cavity 16. The receptacle is (in this example) internally screw-threaded for reception of a screw-threaded spigot of a cleat in use, the thread form 18 bounding a cavity comprising a spigot-receiving socket 20 which is closed by an end wall 22 at an upper end of the receptacle. A bottom end portion 24 of the receptacle is a close fit within a shallow well 25 of the moulding tool defined by a short upstanding tube 23 surrounding the locating pin 12. The pin 12 and the tube 23 form locating means for the receptacle 10. The tube 23 seals the socket 20 from the mould cavity 16 in use of the tooling. In moulding a shoe sole, for example by injection moulding, moulding material would fill the mould cavity 16 surrounding the receptacle and the receptacle would become permanently incorporated into the sole. No moulding material would enter the socket 20.

Figure 2:
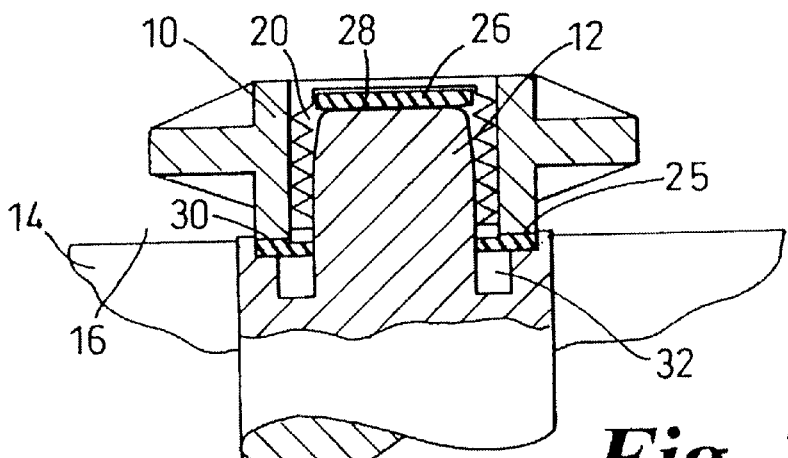
FIG. 2 shows the insert mounted with two elements of moulding material introduced in accordance with a method according to the invention.

FIG. 2 illustrates the method of the invention. A disc 26 of moulding material is provided within the socket 20, trapped between an upper end surface 28 of the locating pin 12 and the end wall 22 of the receptacle. The upper end of the pin 12 has a reduced diameter or lead in to help in locating the receptacle 10. A second annular washer element 30 of moulding material is provided, trapped against the tooling within the well 25 under the bottom end portion 24 of the receptacle. In a conventional manner, uncured rubber material is placed into the mould cavity 16 (lying over the receptacles 10). The mould tooling, being at a temperature of around 140° C., is then closed and the moulding material within the cavity 16 thereby subjected to pressure. The material becomes more fluid and completely envelopes the receptacle (insofar as it is exposed to the mould cavity). As that is happening, the pressure and temperature conditions result in the two elements 26,30 of moulding material associated with the socket 20 becoming fluid, the disc 26 flowing downwards to fill the socket thread form 18 and the annular socket cavity between the receptacle and the locating pin 12. The second element 30 makes up any deficiency in volume of the disc 26 within the socket 20 and also flows into an overflow chamber comprising an annular recess 32 formed in the tool at the root of the locating pin. Within about ten minutes after closing the mould cavity the moulding material (both inside and outside the receptacle) has cured and the mould can be opened for removal of the product.

Figure 3:
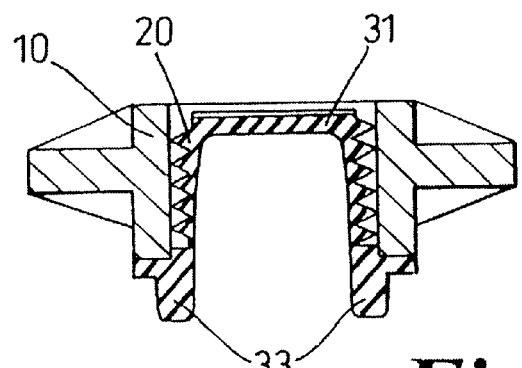
FIG. 3 shows the inset of FIG. 2 removed from the mould after moulding.

As shown in FIG. 3, plugs 31 of moulding material are left lining the sockets of the receptacles 10 when the product is first removed from the mould. The material which has flowed into the recesses 32 form convenient gripping collars (handles) 33 which enable the plugs to be pulled easily out of the sockets 20.

Figure 4:
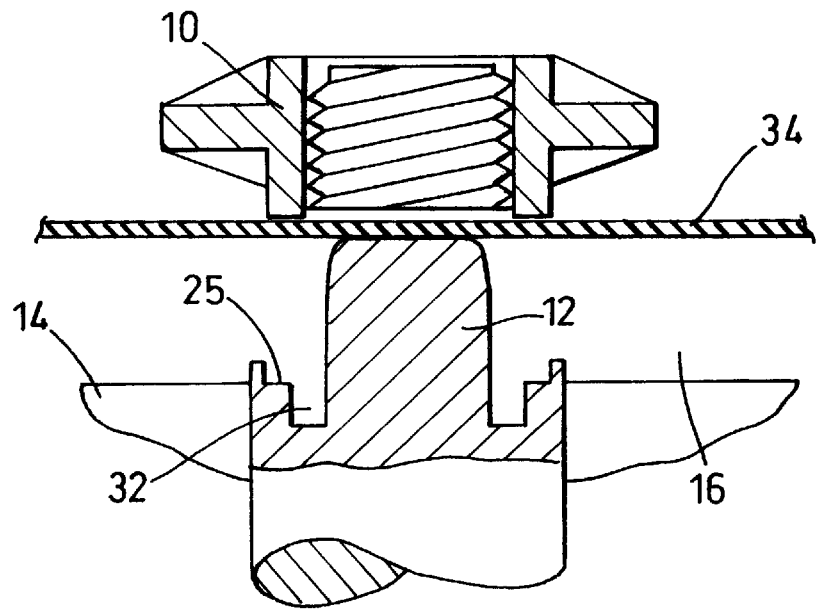
FIG. 4 illustrates a method of introducing the elements of moulding material shown positioned in FIG. 2.

The two elements, disc 26 and washer 30 can be preformed, and placed on and around the pin 12 before the receptacle 10 is located on the pin 12. Alternatively, as shown in FIG. 4, the elements 26, 30 can be introduced beneath the receptacle by introducing a thin (e.g. 2 mm–3 mm) sheet 34 of uncured moulding material between the receptacle and the moulding tool 14 as the receptacle is pressed down onto the locating pin 12. The receptacle 10 and the top surface of the pin 12 are suitably formed to ensure that the elements are sheared from the sheet. A single sheet may be used for all the receptacles within the mould cavity. The mass of sheet remaining within the cavity, after all the receptacles have been positioned, is taken into account in calculating the additional mass of material which must then be introduced into the mould before the mould is closed. However, if required, the remainder of the sheet 34 may be removed before moulding takes place. This may be necessary if the insert 10 being moulded in is required to project from the surface of the compression moulded article. This will not be the case for a receptacle in a shoe sole, but may be necessary for a nut in a vehicle door seal, or other engineering component.

Figure 5:
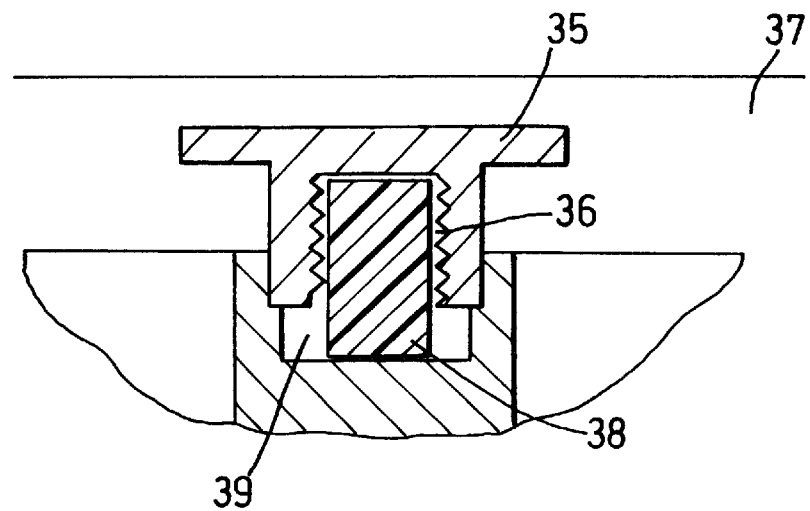
FIG. 5 shows a further insert mounted in a modified tool with a different element of moulding material.

FIG. 5 shows another embodiment of the invention, where an insert 35 with a screw-threaded cavity 36 is to be moulded into a seal member 37. The mould tooling 14 this time does not have an integral pin 12, but simply the locating tube 23 in which the exterior of the insert 35 is a close fit. It will be noted that the insert 35 projects from the surface of the seal member 37. In order to locate the insert 35, the locating pin comprises a cylinder 38 of the moulding material. This is introduced either into the cavity 36 of the insert or the tooling 14. The tooling 14 is arranged so that an overflow chamber 39 for the material from the cylinder 37 is provided underneath the insert 35.

In use, the cylinder 38 and insert 35 are introduced into the mould 16, and then the uncured rubber material. The mould is then closed and subjected to pressure. The cylinder 38 becomes fluid and fills the cavity 36, forming a plug, with any excess collecting in the overflow chamber 39. On completion of the moulding process the mould is opened and the seal 37 removed. The plugs of moulding material left in the cavity 36 can then be removed.

The process of the invention can be used for compression moulding of various different articles requiring hollow inserts, in particular hollow inserts of plastics material.

What is claimed is:

1. A method of compression moulding a shoe sole from rubber moulding material, said shoe sole incorporating at least one receptacle for securing a cleat to the underside of said shoe sole, said receptacle being formed prior to moulding with a cavity adapted to receive said cleat following moulding, the moulding taking place in an enclosed mould at an elevated pressure, the method comprising during moulding creating a pressure within said cavity of said receptacle which substantially balances the pressure exerted on the exterior of said receptacle by said rubber moulding material in said mould.

2. A method according to claim 1, wherein said pressure in the cavity is applied hydraulically.

3. A method according to claim 1, wherein said pressure in said cavity is created by an inflatable insert-locating pin in said cavity.

4. A method according to claim 1, wherein said pressure in said cavity is created by rubber moulding material introduced into said cavity.

5. A method according to claim 4, wherein said moulding material feeds into said cavity of said insert during moulding.

6. A method according to claim 4, wherein said moulding material is introduced into said cavity of said receptacle before said mould is closed.

7. A method according to claim 4, wherein said moulding material introduced into said cavity of said insert is sufficient to ensure that all parts of said cavity are protected by said material.

8. A method according to claim 7, wherein said mould has an overflow chamber into which excess moulding material introduced into said cavity overflows during moulding.

9. A method according to claim 1, wherein said receptacle is supported during moulding on a locating means including a pin for insertion into said cavity and a tube for location of said exterior of said receptacle.

10. A method according to claim 9, wherein said pin is part of said mould tooling.

11. A method according to claim 10, wherein said moulding material introduced into said cavity is provided by a sheet of moulding material cut by said locating means as said receptacle is placed on said locating means.

12. A method according to claim 9, wherein said pin is formed from moulding material.

\* \* \* \* \*